Patented Oct. 7, 1924.

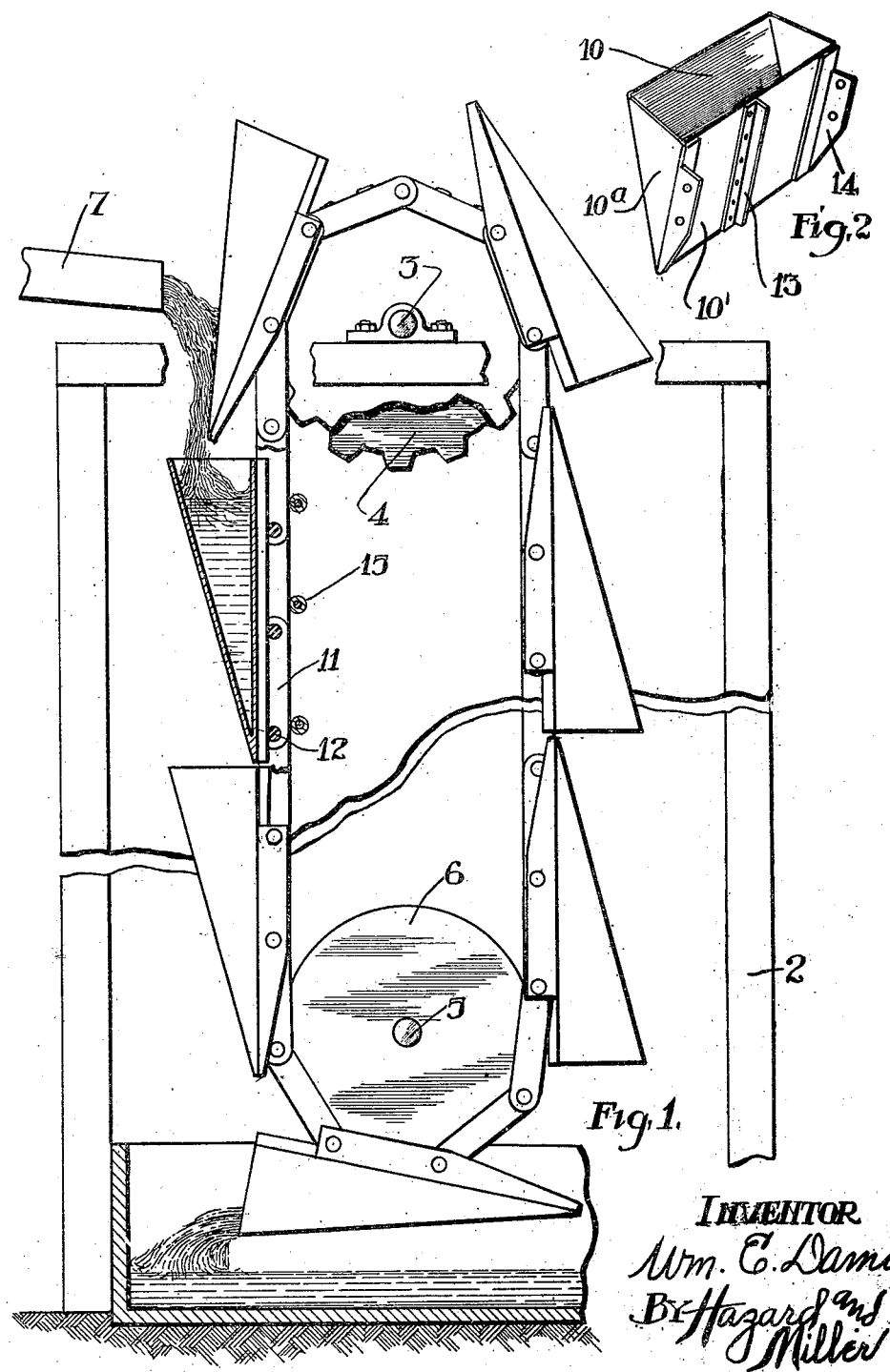

1,510,740

UNITED STATES PATENT OFFICE.

WILLIAM E. DAMON, OF INGLEWOOD, CALIFORNIA.

WATER WHEEL.

Application filed November 24, 1922. Serial No. 602,989.

*To all whom it may concern:*

Be it known that I, WILLIAM E. DAMON, a citizen of the United States, residing at Inglewood, in the county of Los Angeles and State of California, have invented new and useful Improvements in Water Wheels, of which the following is a specification.

This invention relates to power transmitting apparatus and more particularly to water wheels.

It is an object of the present invention to provide an improved water wheel for utilizing the weight of a volume of water for the transmission of power, and it is another object of the invention to provide a water wheel having a series of water carrying buckets which are connected to an endless traveling belt.

Other objects and advantages of the invention will be made manifest in the following specification of an embodiment of the invention illustrated in the accompanying drawings, wherein:

Figure 1 is a side elevation and partial section of the device.

Figure 2 is a perspective of one of the buckets.

In the illustrated embodiment of the invention, the structure includes a suitable frame 2 built upwardly to any necessary height and carrying at its head a transverse power shaft 3, upon which is fixed a pair of sprocket wheels 4. At the lower portion of the frame, there is provided a further shaft 5 upon which is mounted a pair of idler wheels 6. Water is supplied from any suitable source and discharges through a sluice or flume 7. To derive power from the water, a series of buckets 10 is attached to an endless carrier, such, for instance, as a pair of parallel sprocket chains 11 fitting the sprocket wheels 4 and turning loosely around on the idler wheels 6 at the bottom of the apparatus. The sprocket chains 11 are shown as having transverse rods 12 and the pockets 10 have rear walls 10′ preferably of flat form and having a central reinforcing strip 13. The ends of the back of the bucket are provided with rearwardly extending flanges 14 designed to overlap the sides of the sprocket chains 11 and to be fastened to the ends of the transverse chain rods or pivots 12. Preferably each of the flanges 14 is secured upon at least two of the cross pivot rods or pins 12 of the chain to secure strength and rigidity. The buckets 10 extend somewhat at each end beyond their supporting shaft rods 12 and will therefore readily pass around the sprocket end of the idler wheels in tangential position thereto.

A preferred form of the bucket is shown in Fig. 2 as including triangular end walls 10ª, along which the front wall or panel of the bucket is formed or fastened.

In operation, the buckets travel upwardly on one side in inverted position, and as they pass over the top of the sprocket wheels the buckets assume an upright position with their open mouths passing close to the discharge end of the flume 7 and therefore will become filled with the water therefrom.

The loaded buckets passing down become operative to transfer the power derived from the weight of the water to the driving shaft or shafts of the apparatus.

To support the chains 11 in their loaded position, and prevent them from flexing inwardly, suitable means are provided, consisting of rollers 15 arranged transversely across the apparatus and positioned so as to be engaged by the rear inner edges of the chains.

The rear panel or back of each bucket 10′ is reinforced as above stated by the reinforcing strip 13, and this is supported by engagement with the contiguous pivot rods 12 of the sprocket chains.

From the above, it will be seen that I have provided an extremely simple and substantial and efficient form of apparatus for deriving energy from a descending column or stream of water by utilizing the weight of the water as the original source of power.

Further embodiments, modifications and variations may be resorted to within the spirit of the invention as claimed.

What is claimed is:

1. A water power wheel comprising a pair of spaced and connected sprocket chains, the links of the chains being transversely connected by pivot rods, and a series of water receiving buckets, each having flanges at its ends thereby secured upon a contiguous pair of the rods, and the back of each bucket having a reinforcing element engaging the said pair of rods.

2. A water power wheel comprising a pair of spaced and connected sprocket chains, the links of the chains being transversely connected by pivot rods, a series of water receiving buckets, each having flanges at its ends thereby secured upon a contiguous pair of the rods, and the back of each bucket having a reinforcing element engaging the said pair of rods, and rollers against which the chains, flanges and reinforcing elements bear when the buckets are loaded.

In testimony whereof I have signed my name to this specification.

WILLIAM E. DAMON.